United States Patent [19]

Newell, III et al.

[11] 3,802,479
[45] Apr. 9, 1974

[54] CONDITION - RESPOSIVE CLOSURE DEVICE

[76] Inventors: Alfred Turenne Newell, III, 324 Redwood St., Birmingham, Ala. 35210; Larry Winfred Wolfe, 454 Boulevard, N.E., Gainesville, Ga. 30501

[22] Filed: May 18, 1972

[21] Appl. No.: 254,651

[52] U.S. Cl. .................................................. 160/1
[51] Int. Cl. ............................................ E05f 15/20
[58] Field of Search ............................... 160/1, 5, 6; 98/32–35; 62/125, 129; 210/85

[56] References Cited
UNITED STATES PATENTS

| | | | |
|---|---|---|---|
| 3,511,299 | 5/1970 | Newell et al. | 160/1 |
| 2,103,923 | 12/1937 | Vogel | 160/5 |
| 2,463,304 | 3/1949 | Pick | 210/85 |
| 2,656,526 | 10/1953 | MacKay | 210/85 |
| 3,177,674 | 4/1965 | Spofford | 62/129 |

Primary Examiner—Peter M. Caun
Attorney, Agent, or Firm—Robert E. Harris

[57] ABSTRACT

The disclosure pertains generally to curtain-raising and lowering mechanisms and, more particularly, to automatically-operated mechanisms used in connection with cable or rope suspension systems for controlling curtains on animal enclosures, such as cattle sheds, hog parlors and poultry houses, for example. When temperatures within the enclosure are sufficiently high, the curtain is automatically moved to an open position to facilitate appropriate ventilation. When outside temperatures are low, the curtain is normally closed to conserve heat, but is opened automatically when the interior humidity reaches dangerously high levels. Additional controls are provided whereby heavy rainfall or high winds will cause the curtains to close partially to minimize the effects thereof on the interior environment. Similarly, an interior ammonia detector causes the curtain to open partially when ammonia levels become dangerously high.

5 Claims, 6 Drawing Figures

PATENTED APR 9 1974 3,802,479

CONDITION - RESPOSIVE CLOSURE DEVICE

BACKGROUND OF THE INVENTION

The present invention proceeds from the inventors' earlier improvements in a condition-responsive closure operating device, as set forth in U.S. letters Pat. Nos. 3,042,001 and 3,511,299, both assigned to the assignee of this application, the subject matter of which is incorporated here. To this referenced subject matter, the present invention adds three additional control capabilities, which have been found to be of extreme importance in the efficient management of the growth of animals such as, for example, fowl, hogs and cattle.

In recent years, the technology pertaining to the design and construction of animal enclosures has advanced rapidly, as ongoing research into the management of growth has revealed optimal conditions for maximizing growth and controlling diseases. Farmers engaged in raising, for example, poultry, hogs and cattle must have available to them that equipment which takes best advantage of these research findings if they are to operate efficiently and economically.

For these reasons, a great proportion of poultry houses, hog parlors and cattle sheds are being constructed or modified to include automated apparatus for feeding and controlling the environment of the animals. In this regard, many of the enclosures are constructed with one or more walls having large openings for ventilation purposes, with coverings for selectively closing these openings, which coverings are operated automatically in response to devices monitoring various environmental conditions.

In U.S. letters Pat. No. 3,511,299, a device was described for automatically controlling a flexible curtain type closure which might be installed over a screened portion of a wall or walls of a poultry house. The automatic control mechanism disclosed therein is responsive to the temperature and the relative humidity within the enclosure.

The present invention provides a device for automatically controlling a selective closure for an animal enclosure, which is responsive to the temperature and relatively humidity within the enclosure, but which further is responsive to the concentration of ammonia and the presence of excessive drafts within the enclosure and also to the wind velocity and rainfall on the exterior of the enclosure.

It has been determined that in periods of relatively low exterior prevailing temperatures, when temperature - responsive automatic closures would tend to restrict ventilation most of the time, a substantial increase in the presence of ammonia fumes within an animal enclosure is noted. These ammonia fumes, which are attributable to gases generated from poultry or animal droppings or manure as they decay, are harmful to birds or animals in excessive concentration levels. Excessive ammonia fumes can cause injury to the eyes, respiratory systems and skin of fowl or other animals. In some cases, the injuries caused might lead to blindness, blistering of the skin and/or death. Injuries of this sort naturally reduce a farmer's ultimate revenues.

Thus, it is desirable that an automatic closure operating device also be responsive to the level of ammonia fumes within the enclosure, to the extent that ventilation be permitted to clear the air within the enclosure, at the cost of increased fuel consumption to maintain desired temperature levels.

There are times when prevailing temperature and humidity levels within an animal enclosure might be higher than desirable, thus causing an automatic closure control responsive to these conditions to permit ventilation. At the same time, however, there may be heavy rainfall, possibly wind-driven, at the site of an animal enclosure, which could cause excessive moisture to enter the enclosure through the ventilation openings. Excessive moisture within the enclosure destroys the ability of the litter to absorb moisture from droppings and the like and the dampened litter serves as an enhanced breeding site for micro-organisms which can seriously impair the health of or be fatal to birds or livestock within an enclosure.

Even in the absence of heavy rainfall, the existence of high winds in the vicinity of an animal enclosure can also be potentially injurious to the birds or livestock within. Thus, while the temperature reading with the enclosure may be sufficiently high that a temperature-responsive closure control might permit ventilation, the admission of rapidly-moving air from the outside can create excessive drafts which can chill the animals within the enclosure. Thus it has been determined that it is the wind-chill factor which is a more significant factor than the temperature reading within an enclosure. In this connection, it might be noted that a temperature of 50° in a 20 m.p.h. wind has a chill factor on birds or animals equivalent to a temperature of 40° in a still atmosphere.

Therefore, it is equally desirable that an efficient automatic closure operating device should be responsive, to some extent, to the prevailing wind velocities and rainfall levels in the vicinity of the animal enclosures.

Accordingly, it is a general object of the present invention to provide a practical and economical ventilating closure control device for an animal enclosure, which operates automatically in response to interior temperature, humidity, drafts and ammonia concentration levels and also to exterior wind velocity and rainfall levels.

Additionally, it is an objective of the present invention to provide an efficient system of automatically positioning any or all of the curtains, shutters, windows, louvers or other closures on all sides of an animal enclosure by means of a connected series of cables or ropes attached to a central power unit controlled and actuated by a thermostat and/or humidistat and/or ammonia level detector and/or wind velocity detector and/or rainfall rate detector and/or time clock, thereby substantially stabilizing the ambient room temperature and/or humidity and controlling and minimizing the ambient ammonia concentration and/or the presence of excessive drafts and/or moisture, and thereby providing controlled ventilation.

A further objective of the present invention is to provide a system having the capabilities outlined above which may be adapted to existing animal enclosures, such as, for example, poultry houses, hog parlors, and cattle sheds, and may be installed by non-skilled labor.

BRIEF DESCRIPTION OF THE DRAWINGS

The aforementioned objectives and other objectives, features, and advantages of the present invention will become more readily apparent from a consideration of the detailed description hereinbelow, when considered in conjunction with the accompanying drawings, wherein.

DETAILED DESCRIPTION OF THE DRAWINGS

Figure 1:
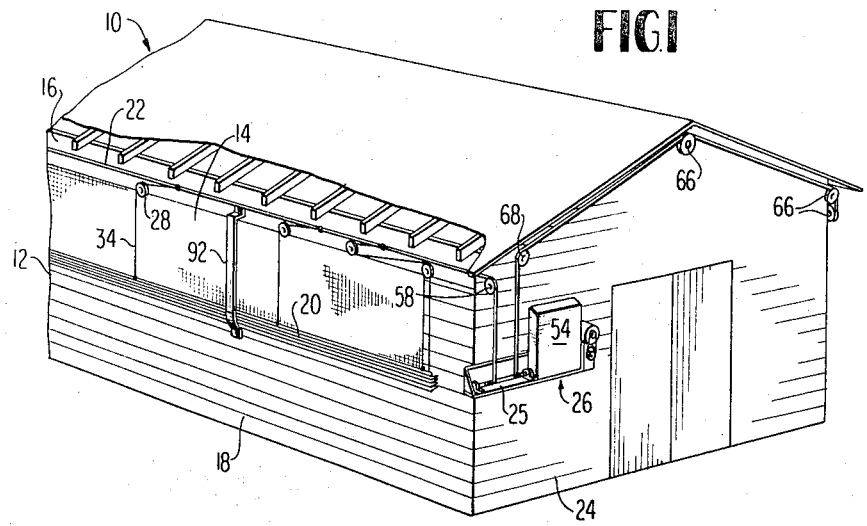
FIG. 1 is a fragmentary isometric view of one side wall and an end wall of the outside of an animal enclosure, such as a poultry house, illustrating an automatic curtain-operating apparatus attached thereto.

An animal enclosure, such as, for example, a poultry house, a hog parlor or a cattle shed, is indicated generally by reference numeral 10. Enclosure 10 includes a pair of side walls 12 and a pair of end walls 24. Each of the side walls 12 is provided with a large ventilation opening covered by a screen 14, a plank 16 above the screen 14 and a panelled section 18, formed from any suitable siding materials, below the screen 14. Side wall 12 is also provided with a curtain 20, secured by nails, screws or by any other suitable fastening means, to the upper edge of panelled section 18, below screen 14. The curtain, which is fabricated from a suitable, flexible, weather-resistant material, is arranged in such a manner that it may be extended upwardly to completely cover the screened opening. Alternatively, the curtain 20 could be secured above screen 14 and arranged such that it could be extended downwardly to cover the opening.

In the embodiment illustrated, a main draw cable 22, of suitable, flexible material, such as wire, rope, nylon cord, wire rope or chain, extends horizontally along the side walls of the enclosure, adjacent plank 16, to an end wall 24, where it is connected to a power unit 26, attached to the end wall. The specific location of power unit 26 is insignificant. For convenience in specific installations, it might be located on a side wall and it might be advantageously located on the inside rather than the outside of a wall of the enclosure 10.

Attached to plank 16 are a series of small pulleys 28, which are preferably spaced regularly at intervals of approximately four to eight feet. Flexible curtain 20 is provided with a series of holes or eyelets 30 along an upper edge 32 at intervals of approximately the same length as the spacing between the pulleys 28. Upper edge 32 of curtain 20 may be of stiffened construction or it may be provided with a relatively rigid member attached thereto in any suitable manner, to hold the curtain in a horizontally-stable position. A plurality of auxiliary draw cables 34, also of suitable flexible material, are secured, at one end thereof, to each of the eyelets 30. From the upper edge 32 of curtain 20, the auxiliary cables 34 extend vertically to pulleys 28, then around same, then horizontally to any suitable attaching means, such as clamp 36, secured to main draw cable 22, to which auxiliary cables 34 are secured at their opposite ends.

Figure 4:
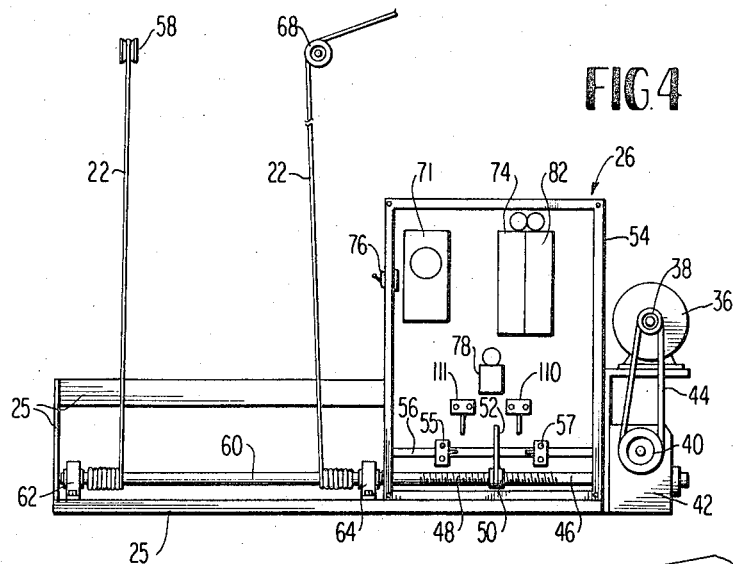
FIG. 4 is a fragmentary, enlarged, detailed elevation view of the power unit mounted on a wall of the enclosure, or in any other convenient location, illustrating the automatically-actuated drive mechanism for the curtain, the connecting cables attached to the curtain and the attachment of the connecting cables to the drive mechanism.

With reference particularly to FIGS. 1 and 4, power unit 26 is preferably positioned on a frame attached at one side of end 24. According to the preferred embodiment illustrated, power unit 26 is provided with a reversible electric motor 36. Motor 36 is provided with an output drive shaft 38 connected, through a belt-type driving means 44, to an input shaft 40 of a gear speed-reduction means, or any other suitable speed-reducing means 42. The gear speed-reduction means is provided with an output shaft 46 of relatively long length and a threaded portion 48 of shaft 46 is located near the gear speed-reducing means. An internally-threaded ring 50, provided with a radially outward-extending flange portion 52, is positioned on the threaded portion 48 of shaft 46. The threaded portion 48 of shaft 46 is preferably located within a housing 54 and a shaft or rod member 56 is positioned alongside shaft 46, in parallel relationship therewith, within housing 54 such that the free end of flange portion 52 contacts rod member 56. As shaft 46 rotates, ring 50 and flange portion 52 thereof constitute a travelling means which moves axially of shaft 46, as contact between the flange portion 52 and rod member 56 prevents rotation of ring 50 with shaft 46.

A first bearing means 62, in which shaft 46 is journalled, is attached to frame 25 at the end of the shaft 46 furthest from gear speed-reducing means 42 and a second bearing means 64, also attached to frame 25 and through which shaft 46 is journalled, is located adjacent the outside of housing 54. Main draw cable 22 is looped over a pulley 58, which is suitably attached to end wall 24, then extended vertically downward and one end thereof is suitably attached to the outer end of an extended portion 60 of shaft 46, between bearing means 62 and 64. Although shaft 46 is shown as a constant-diameter rod, the extended portion 60 may be comprised of or provided with a drum of larger diameter. Main draw line 22 from the opposite side wall is guided along the end wall by means of a system of pulleys 66 and over a pulley 68, thence extended vertically downward to shaft 46, where it is secured, at one end, to extended portion 60. Preferably, main draw cable 22 from pulley 58 is secured to shaft 46 near the first bearing means 62 and main draw cable 22 from pulley 68 is attached to shaft 46 near the second bearing means 64. The ends of main draw cables 22 not secured to shaft 46 may be attached to a weight or other suitable biasing means (not shown), in the region of the end wall 24 not visible in FIG. 1, to maintain tension in the cables.

Figure 3:
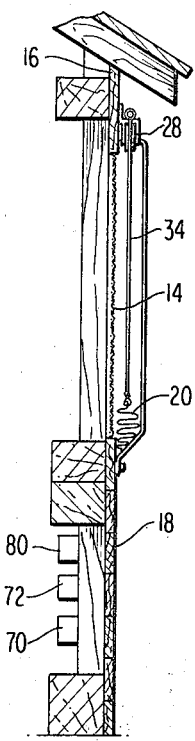
FIG. 3 is a sectional view taken on line 3—3 of FIG. 2.
Figure 2:
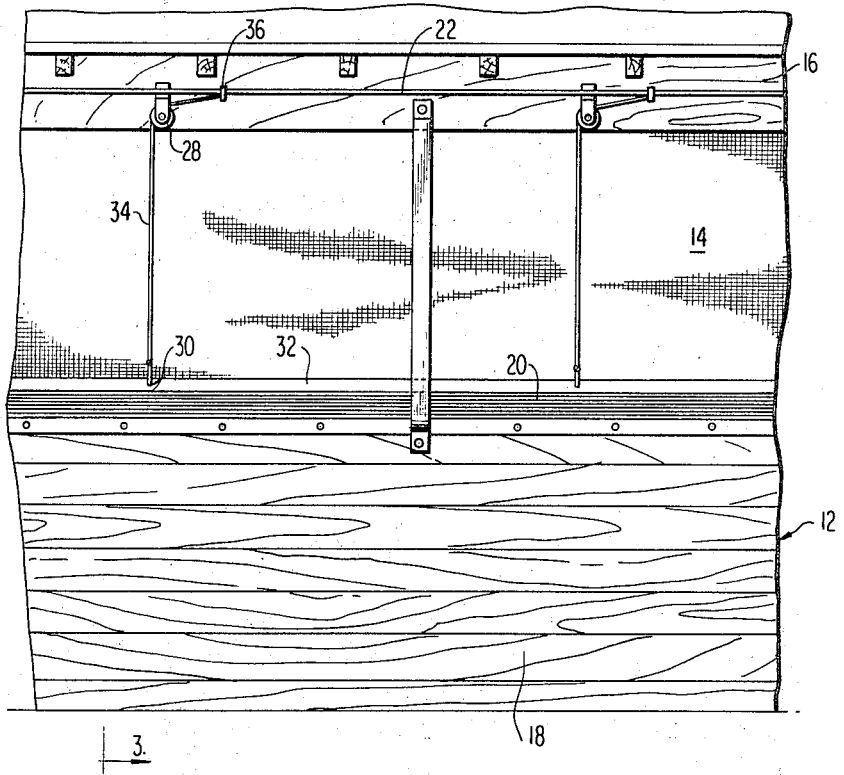
FIG. 2 is a fragmentary elevation view of the outside of the side wall of FIG. 1.
Figure 5:
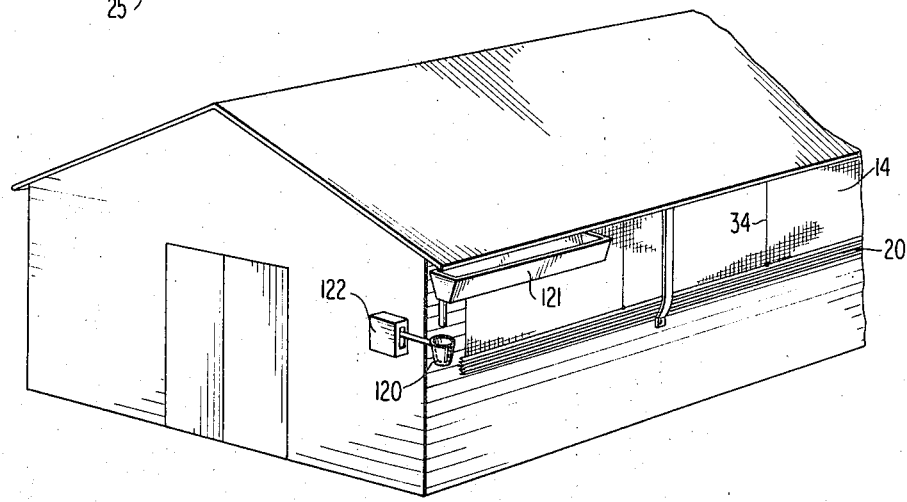
FIG. 5 is a fragmentary isometric view of one side wall and an end wall of the outside of an animal enclosure, such as a poultry house, illustrating a rainfall level detector.

Reversible motor 36 is energized by one of eight means: namely, a thermostat, a humidistat, a switch actuated by an ammonia concentration detector, a switch actuated by a rainfall level detector, a switch actuated by a wind velocity detector, a time clock control, a manual switch or a combination of the above. The thermostatic and humidistatic controls, as well as the ammonia concentration detector, may be positioned in any convenient location within the enclosure 10, such as on plank 16 or panelled section 18, as illustrated by the reference numerals 70, 72 and 140 in FIG. 3. The rainfall level detector and the switch actuated thereby, illustrated in FIG. 5, and the wind velocity detector and the switch actuated thereby, illustrated in FIG. 6, may be positioned in convenient locations on the walls or roof of the enclosure 10. Suitable electrical connections (not shown) may be employed to connect the various actuating means and controls to the reversible electric motor 36. A thermostat 70, comprised of any well-known suitable temperature-sensing means, may be employed to actuate power source-reversing relay 71, positioned within housing 54 and connected to electric motor 36, upon the rise and fall of temperature beyond certain pre-determined levels. Preferably, a time clock 74, also positioned within housing 54 and connected between a source of electrical power and motor 36, is arranged so as to allow electric motor 36 to function for approximately 1 or 2 minutes out of each 10 minutes. Thus, during the majority of the time, the electric power which operates motor 36 is disconnected by time clock means 74, thus causing curtain 20 to be raised or lowered in incremental steps depending upon the setting of time clock 74.

Alternatively, time clock 74 may be connected within the system to be operative only during periods of rising temperatures, thus causing incremental movement of curtain 20 only when it is being lowered.

During periods of falling temperature, power-reversing relay 71 is activated to connect a power source to electric motor 36, causing the motor to rotate in a direction such that the output shaft 46 of gear speed-reducing means 42 is rotated in a direction to cause the main draw cables 22 to be wrapped around the extended portion 60, thus causing curtains 20 to be raised. As temperatures rise, thermostat 70 activates power-reversing relay 71, reversing the excitation of electric motor 36, thus causing it to rotate in the opposite direction. Consequently, during periods of rising temperatures, shaft 46 is rotated in a direction which unwinds main draw cables 22 from extended portion 60, allowing the curtain to fall. From the foregoing, it is readily observed that when time clock 74 functions to permit motor 36 to operate, thermostat 70 controls the direction of rotation of shaft 46, thereby controlling the raising or lowering of curtain 20. Under conditions in which relative humidity is high, but temperature is not sufficiently high that thermostat 70 functions to cause the lowering of curtain 20, a humidistat 72, which functions when the humidity rises above a pre-determined level, activates a relay 78, positioned in housing 54, which relay serves to disconnect thermostat 70 and to lower curtain 20, when power is provided by time clock 74. Thus, according to the present invention, relay 78 constitutes a means for overriding temperature control if a maximum pre-determined humidity level is exceeded.

However, even though the relative humidity may be excessive, outside temperatures may be so low that increasing the curtain opening in an attempt to reduce the humidity may cause the interior temperature to fall below a pre-determined minimum level, desirable for healthy living conditions for the animals therewithin. Preferably, therefore, a second thermostat 80 is electrically connected in series with humidistat 72 such that the humidity control circuit may be disconnected in the event that the interior temperature falls below a pre-determined minimum level. When the thermostat 80 opens the humidity control circuit, it activates power-reversing relay 71 which causes motor 36 to close the curtain. Thereafter, the control of the curtain is restored to thermostat 70 and humidistat 72. An additional time clock 82 may be associated with relay 78 such that motor 36 is permitted to function approximately one or two minutes out of each hour. Thus, during the remaining time, the electrical power to motor 36 may be disconnected, establishing an incremental character to the opening of the curtains during humidity control in much the same manner as that imparted by time clock 74 in the operation of the curtains under temperature control.

Rod member 56 is provided with limit switches 55 and 57 positioned thereon. These limit switches 55 and 57 may be secured against movement at any position on rod member 56 and may be connected to establish an electrical power cut-off to cease the operation of motor 36 when the curtain reaches desired maximum and minimum open positions. Preferably, limit switches 55 and 57 are actuated by pressure upon contact between flange portion 52 of travelling ring 50 and one of the limit switches at opposite ends of ring travel. The switches 55 and 57 are adjustable in position to enable power unit 26 to be installed on various animal enclosures having ventilation openings of varying dimensions.

It is also within the contemplation of the present invention that the mechanism for limiting the travel of curtains 20 might be positioned outside of housing 54, e.g., closer to or adjacent main draw cable 22. In this arrangement (not shown), the limit switches 55 and 57 might be positioned alongside the cable so that a member or members affixed to the cable can make contact with and activate the switches.

Ammonia concentration detector 140 functions in a manner similar to humidistat 72. Thus, when the temperature within the enclosure 10 is not sufficiently high as to cause thermostat 70 to activate motor 36 to open the curtains and when the humidity within enclosure 10 is not sufficiently high as to cause humidistat 72 to activate motor 36 to open the curtains, it may still happen that the gases generated by the animal wastes within the enclosure 10 produce an excess concentration of ammonia fumes within the enclosure. Thus, for example, if the ammonia level sensed by detector 140 should exceed a healthy level, such as 100 parts per million, the detector 140 activates power-reversing relay 78 or a separate power-reversing relay (not shown) to energize motor 36 to cause the curtains to open.

In those instances when the curtains 20 are opened at a signal generated by the ammonia detector, when, as noted above, neither the interior temperature nor humidity levels are sufficiently high as to cause the curtains 20 to be opened, it is undesirable for the curtains to be opened to a "full open" position, corresponding to the contact point between flange portion 52 and limit switch 55 or 57. For this reason, an additional pair of limit switches 110 and 111 are positioned adjustably within housing 54, one of which corresponds to a partially-open position of curtains 20 and is interposed in series with the ammonia detector 140 to terminate the travel of the curtains 20 beyond this point, thus affording some ventilation of the enclosure to reduce the presence of ammonia fumes to a safe level such as, for example, less than 25 parts per million and, at the same time, precluding excessive cooling of the interior to dangerously low levels or conserving fuel for the heaters therewithin (not shown).

As mentioned hereinabove, there are times in which the temperature reading within the enclosure 10 would be sufficiently high to cause thermostat 70 to actuate power-reversing relay 71 so as to cause the curtains 20 to open to permit maximum ventilation, but when there may be extremely heavy rainfall prevailing in the area of the enclosure and/or high winds, either or both of which conditions might cause unhealthy conditions for the animals within the enclosure if the curtains 20 were fully opened to permit maximum ventilation. For this reason, a rainfall level detector 122 (FIG. 5) and a wind velocity detector 131 (FIG. 6) are contemplated as additional control devices for the position of curtains 20. The rainfall detector 122 includes a trough 121 for collecting rainfall over a fairly large area on the exterior of the animal enclosure 10. The rainfall collected within trough 121 is conducted, via an integral downspout, to a metering cup 120 which is provided with a bottom having outlets with a known drain rate. When the weight of water within cup 120 exceeds a predetermined level, corresponding to an excessive level of rainfall which could cause excessive moisture to enter the enclosure 10 through the uncovered screens 14, a switch is tripped within detector 122, which activates either power-reversing relay 71 or another power-reversing relay (not shown) so as to energize motor 36, causing the curtains 20 to be raised toward a closed position.

Thus, it can be seen that rainfall level detector 122 effectively serves to override thermostatic control 70 under certain conditions. Under these circumstances, with excessively high interior temperatures, it is undesirable for the curtains 20 to be raised to a "full closed" position. Preferably, the travel of curtains 20 can be arrested in a partially-closed position to permit some ventilation while preventing the entry of excessive moisture. This is accomplished by interposing one of limit switches 110, 111 in series with the rainfall level detector to terminate the supply of power to motor 36 when the curtains 20 have been raised to a pre-determined level.

Figure 6:
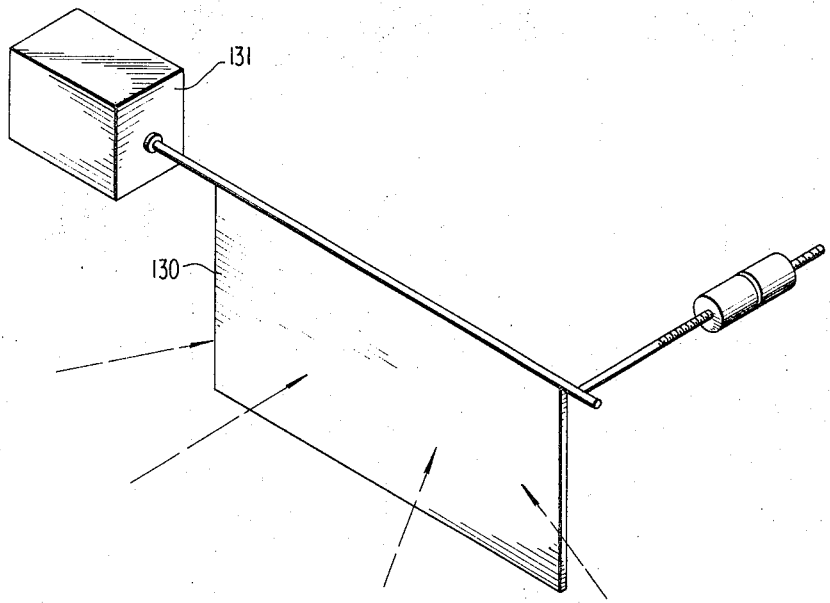
FIG. 6 is a diagrammatic representation of a wind velocity detector or sail switch intended for use in controlling the operation of the curtain drive mechanism.

Functioning within the system contemplated by the present invention in a manner similar to the rainfall level detector is a wind velocity detector 131 (FIG. 6). The wind velocity detector 131, which is illustrated diagrammatically in FIG. 6, includes one or more sails 130 arranged upon an arm, one end of which is movable within a pressure switch mechanism arranged such that a wind exceeding a pre-determined velocity will cause the switch to activate power-reversing relay 71 or another power-reversing relay (not shown). One or more wind velocity detectors may be employed in the most suitable location relative to the enclosure 10. In this connection, it may be desirable to position one of these detectors within enclosure 10 to function and cause curtains 20 to move toward a closed position when interior drafts exceed a pre-determined magnitude. As in the case of the rainfall level detector control described above, it is preferable that the wind velocity detector control be arranged in series with one of limit switches 110, 111, so that the curtains 20 are not completely closed when the thermostat 70 is overridden. Because of their similar functions within the control system according to the present invention, the wind velocity detector and rainfall detector may be connected in parallel with one another.

A plurality of bracket means, such as those indicated by reference numeral 92, attached in any suitable manner at one end to plank 16 and at opposite end to panelled portion 18, may be provided to maintain curtain 20 in a given spaced relationship with respect to screen 14. Alternatively, the moveable edge of curtain 20 might be weighted by means of a pipe or rod inserted within a hem formed therein, thus obviating bracket means 92 or the like.

Manual operation of power unit 26 may be achieved by means of a manually-operable switch 76 positioned on housing 54. Switch 76 should be arranged such that electric motor 36 may be activated either automatically or manually in both directions.

In addition to manual control established by means of switch 76, an additional switch (not shown), similar to switch 76, may be provided to afford control of the opening and closing of the curtains solely by means of time clock 74 and/or 82. Operation in this mode would be desirable when temperature and humidity within enclosure 10 remain fairly constant, but periodic ventilation is nevertheless desirable.

Although the present invention has been described with reference to the details of a specific, preferred embodiment, it is to be understood that numerous structural modifications may be effected without departing from the spirit or scope of the invention.

What is claimed is:

1. In an enclosure for animals, poultry and the like, having side walls and an overhanging roof constituting a substantially closed structure with a ventilating opening in a side wall thereof and a closure member for such ventilating opening movable between a lowered full-open position and a raised full-closed position, an automatic control system for such closure member, comprising means for moving such closure member toward the opened position and toward the closed position in response to temperatures within such enclosure respectively greater than and less than predetermined levels, means responsive to a relative humidity above a predetermined level within such enclosure for rendering inoperative said temperature-responsive means and for moving such closure member toward the open position, means for rendering inoperative said humidity-responsive means in response to temperatures within such enclosure below a predetermined minimum level, means responsive to a concentration of ammonia in excess of a selected level in the air within such enclosure for rendering inoperative said temperature-responsive means and for moving such closure member toward the open position irrespective of the temperature within such enclosure, and means responsive to the movement of such closure means to a selected partially-open position for rendering inoperative said ammonia concentration responsive means, whereby the interruption of the basic temperature-control function under conditions of excess humidity is terminable by a sufficient drop in relative humidity and by an excessive drop in temperature within the enclosure, whichever occurs first, whereas the interruption of the basic temperature-control function under conditions of excessive ammonia concentration is terminable by a sufficient drop in ammonia concentration and by the opening of such closure member to a predetermined extent, whichever occurs first.

2. An automatic control system in accordance with claim 1, and including timing means for causing said movement of such closure means under the control of each of said environment-responsive means to be performed in incremental steps of movement separated by periods of no movement.

3. An automatic control system in accordance with claim 2, wherein the ratio of the periods of movement to periods of no movement is smaller under the control of said humidity-responsive means and of said ammonia concentration responsive means than under the control of said temperature-responsive means.

4. An automatic control system in accordance with claim 1, and including
   means responsive to the occurrence of rainfall on such enclosure for rendering inoperative said temperature-responsive means and for moving such closure member toward the closed position irrespective of the temperature within such an enclosure, and
   means responsive to movement of such closure member to a selected partially closed position for rendering inoperative said rainfall-responsive means.

5. An automatic control system in accordance with claim 1, and including
   means responsive to a wind velocity in excess of a selected level in the ambient air at such enclosure for rendering inoperative said temperature-responsive means and for moving such closure member toward the closed position irrespective of the temperature within such enclosure, and
   means responsive to the movement of such closure means to a selected partially-closed position for rendering inoperative said wind velocity responsive means.

* * * * *